Jan. 19, 1932. T. J. McNULTY 1,841,492
OIL PRESSURE CONTROL AND FILTER FOR HYDRAULIC PRESSES
Filed June 1, 1929 2 Sheets-Sheet 1
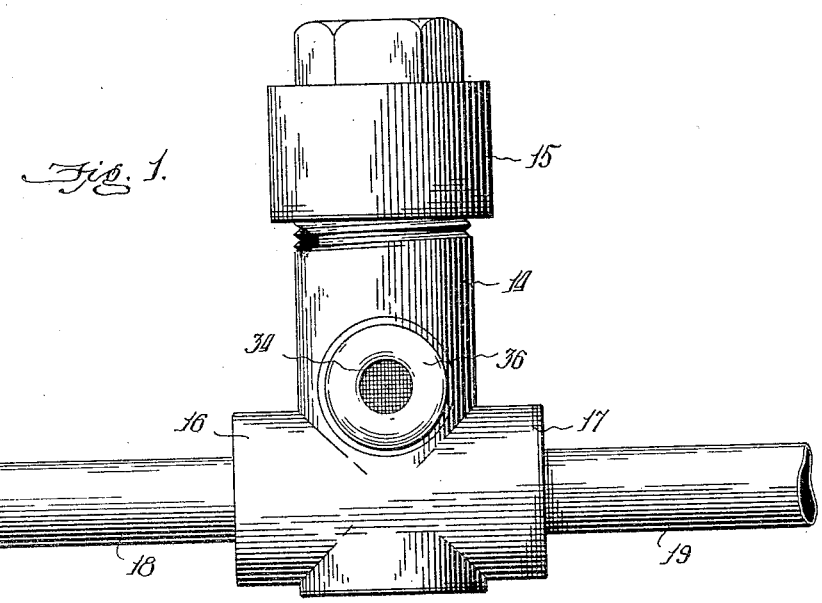
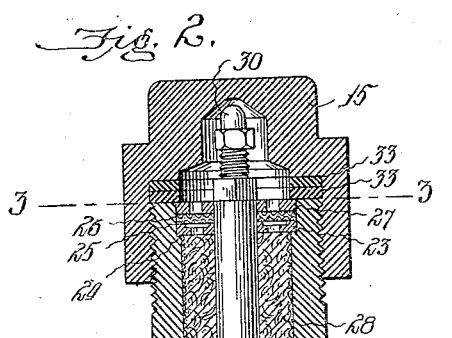
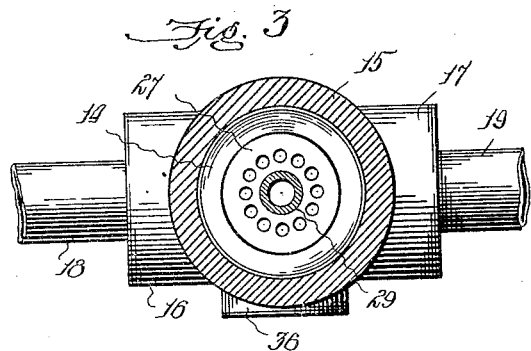
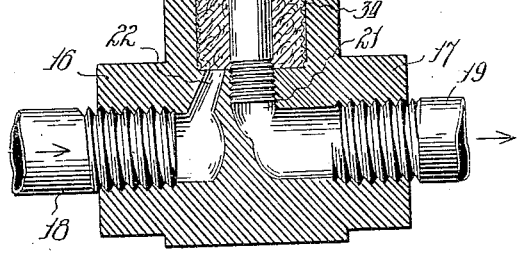
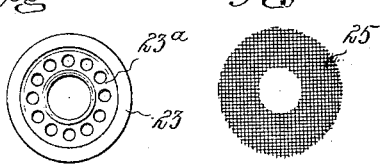
Inventor:
Thomas J. McNulty.
By Horace S Beall
Attorney.

Jan. 19, 1932.　　T. J. McNULTY　　1,841,492
OIL PRESSURE CONTROL AND FILTER FOR HYDRAULIC PRESSES
Filed June 1, 1929　　2 Sheets-Sheet 2
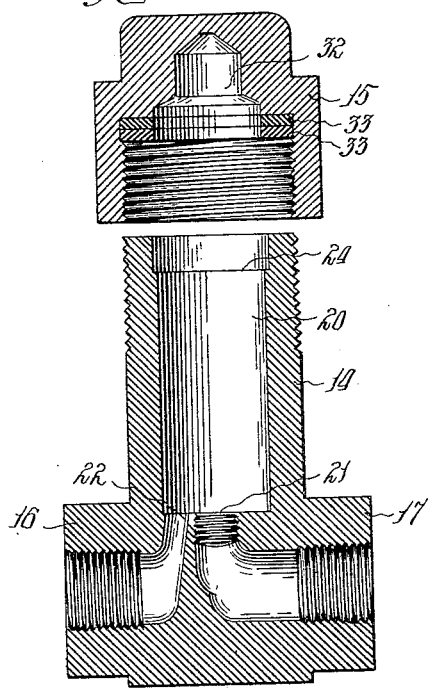
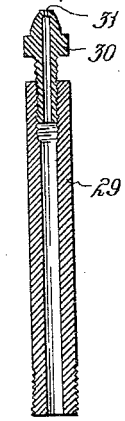
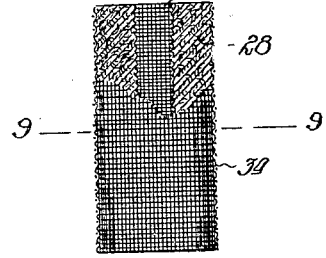
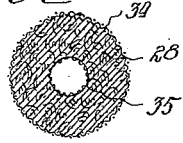
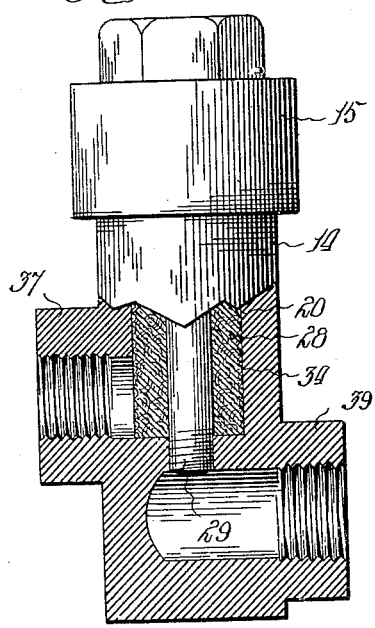
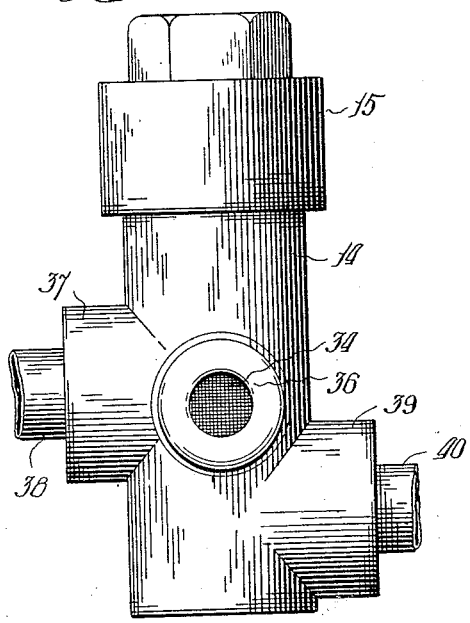
Inventor:
Thomas J. McNulty.
By
Attorney.

Patented Jan. 19, 1932

1,841,492

UNITED STATES PATENT OFFICE

THOMAS J. McNULTY, OF BROOKHAVEN, MISSISSIPPI

OIL PRESSURE CONTROL AND FILTER FOR HYDRAULIC PRESSES

Application filed June 1, 1929. Serial No. 367,819.

My invention is an improvement in hydraulic presses used in oil mills in the operations of forming the cake as well as extracting the oil from the cake, and relates more especially to means for controlling the oil pressure to the ram.

The modern practice in oil mills is to operate the ram under a low pressure of oil up to a predetermined point and then continue the operation under a high pressure of the oil, for which purpose it is customary to employ automatic change valves by which to regulate the pressure in the formation of the cake and expressing the oil therefrom, but I have found by practical experience there is no need of using two different pressures in the line to the press as a constant flow up to 500 pounds will give the desired result in the extraction of the oil and afford a saving in press cloth.

The primary object of my invention therefore is to provide a constant regulated flow of oil to the ram by means of a combined filter and pressure control device that will take the place of the usual automatic change valves, the latter being not only unreliable in operation but subject to considerable wear affecting the working of the press as well as adding to the cost of operation, the combined filter and flow control in the present instance producing a fluency of the oil which will provide a continuous pressure imparting a gradual steady rise to the ram to increase the efficiency of the press and preserve the press cloth.

With this principal object in view my invention contemplates the provision of a device to be incorporated in the pipe line to the press by means of which the oil is forced through filtering material and fine mesh screens for passage through a small orifice by which the flow to the press is controlled, the size of the orifice determining the speed of operation of the ram.

My invention further contemplates a particular construction of the combined oil filter and pressure control; all as hereinafter fully described and more specifically set forth in the appended claims.

In the accompanying drawings:

Figure 1 is an elevation of the combined oil filter and pressure control in accordance with my invention.

Fig. 2 is a vertical sectional view through the same.

Fig. 3 is a transverse sectional view on the line 3—3 of Fig. 2.

Fig. 4 is a detail view of one of the perforated disks forming a part of the filter.

Fig. 5 is a detail view of one of the filtering screens.

Fig. 6 is a detail sectional view of the casing with the closing cap detached from the body.

Fig. 7 is a detail sectional view of the oil pressure control device used in connection with the filter.

Fig. 8 is a detail view, partly in section, showing a modification of the basket containing the filtering material.

Fig. 9 is a sectional view on the line 9—9 of Fig. 8.

Fig. 10 is an elevation illustrating a modification in the construction of the casing, and Fig. 11 is a similar view with the lower portion of the casing broken away to show the arrangement of the inlet and outlet openings.

My invention is especially adapted for use in connection with oil mills in which a hydraulic motor employing oil as the fluid pressure is used with a pump driven by motive power such as a steam engine, the combined filter and pressure control device being incorporated in the pipe line to the pump.

In carrying out my invention the casing which contains the filter and means for controlling the oil pressure comprises a body portion 14 and removable cap 15, the body portion 14 having integral coupling members 16 and 17 at opposite sides of the lower end thereof into which pipes 18 and 19 leading to and from the casing are threaded and within said body portion is a filtering chamber 20 through the bottom of which extend openings 21 and 22 communicating with the outlet 17 and inlet 16 respectively, opening 21 being located centrally and threaded to receive the pressure control device hereinafter described. The upper part of the filter chamber is enlarged to receive a perforated annular disk 23 resting on the shoulder 24 formed by enlarging the chamber, and upon this disk are placed fine mesh screens 25 and 26, one upon another, held in place by a second perforated annular disk 27 the upper surface of which is approximately flush with the upper end of the body portion of the casing, the aforementioned perforated disk 23 being provided with an annular groove 23a (Fig. 4) in the side thereof next the screen mesh. The oil passes up in the filtering chamber 20 to the disks and screens hereinbefore mentioned through filtering material 28, and extending upward through the center of this filtering material, disks, and screens, is a tube 29 threaded at its lower end in the opening 21 and provided at its upper end with a nipple 30 having a small orifice or inlet opening 31 (Fig. 7), the nipple being preferably detachable and therefore threaded into the upper end of the tube so that it may be readily removed for substitution of a nipple having an orifice of a different size or in case the orifice in said nipple should become worn from use. The nipple projects above the upper disk 27 of the filtering device into a cavity 32 in the cap 15, said cavity forming a reservoir for the oil with the upper or inner end thereof tapered and the end of the nipple located a suitable distance from the apex, and for the purpose of forming a tight joint between the cap and upper end of the body portion of the device leather gaskets 33—33 are interposed as shown in Fig. 2 of the drawings.

The filtering material 28 in the casing is enclosed in a wire screen basket 34 for convenience in removing the same, the modification in Fig. 8 including an inner lining 35 of wire screen to fit around the central tube 29 of the pressure control device, and for cleaning said filtering material while it is contained in the filtering chamber a clean-out opening 36 is provided in one side of the casing on a line with the bottom portion of said chamber and normally closed by a valve nipple (not shown). The filtering material is preferably press cloth darning yarn though of course any other suitable material may be used, and the wire screen mesh between the annular disks 23 and 27 is very fine, about 120 mesh, so as to strain the oil of any foreign matter that may pass through the filtering material and thus prevent choking of the orifice in the nipple which is approximately 50/1000 of an inch for a high pressure feeding line and $\frac{1}{16}$ to $\frac{3}{32}$ of an inch in the low pressure line; it being understood of course that filtering and pressure control devices of my invention are located in both lines leading to and from the hydraulic motor or ram.

As a modification of the casing the inlet opening may be located on a line with the bottom of the filtering chamber, as illustrated in Figs. 10 and 11 of the drawings, in which 37 designates the coupling for the pipe 38 leading to the opening into the filtering chamber and 39 the coupling for the pipe 40 communicating with the passage from the lower end of the tube 29 of the pressure control, otherwise the device is the same as that described with reference to Figs. 1 and 2, like numerals of reference being used for like parts in both forms.

The operation of my improved means for controlling the fluid pressure of the oil to the ram will be understood from the foregoing description, for the oil from the storage tank entering the device through the inlet 16 and passing through the filtering material 28 and fine mesh screens 25 and 26 is purified of any foreign substances,—as foots, or grit from the packings of the pump,—and will flow freely through the reducing orifice in the nipple 30 to the tube 29 and on to the ram through pipe 19 of the pipe line, the size of the orifice governing the pressure of the oil on the ram and preventing any danger of the oil flowing so fast as to cause the pump to run away. As will be obvious the filtering of the oil will eliminate the possibility of the orifice becoming choked, and consequently as there will be a steady flow of the oil the presses will travel the full height at all times resulting in a better extraction from the oil bearing meats or cake thus increasing the output of oil from the same.

The filtering material in the chamber of the casing can be cleaned or flushed out by removing the cap and blowing out through the clean-out opening having the valved nipple, or the filtering material may be renewed by simply removing the basket and replacing it with another one having the packing confined between the cylindrical wire screens forming the basket, the inner screen or lining 35 facilitating the insertion of the confined packing over the tube. Furthermore, the rate of flow through the reducing orifice in the removable nipple may be varied according to operation desired by substituting a nipple having the required orifice.

I have herein shown and described the preferred embodiment of my invention, but it will be understood that changes or modifications in the form of the device or arrangement of parts may be resorted to within the scope of the claims in carrying out the purpose to provide for thoroughly filtering the oil and reducing the flow to the ram by a minute orifice through which the oil passes in a fine steady stream to produce the required pressure for a more effective operation of the press.

I claim:

1. In a hydraulic press a device for controlling the pressure of oil to the ram comprising a casing having a body portion forming a filtering chamber open at its upper end, inlet and outlet openings through the casing at the closed end of the filtering chamber, a removable cap closing the open end of the filtering chamber and forming a reservoir, a tube extending from the outlet opening through the filtering chamber into said reservoir, a nipple on the end of the tube having a minute orifice to control the pressure of oil flowing from the casing to the ram, a fibre packing in the lower portion of the filtering chamber, annular perforated disks above the fibre packing and through which the tube passes, and fine mesh screens interposed between the annular perforated disks.

2. In a hydraulic press a device for controlling the pressure of oil to the ram comprising a casing having a body portion forming a filtering chamber enlarged at its upper open end to form a shoulder, said casing having inlet and outlet openings at its lower end, the outlet opening being centrally located, a removable cap closing the upper end of the casing and forming a reservoir at the upper end of the filtering chamber, a tube connected to the outlet opening and extending upward at the center of the filtering chamber into the reservoir in the cap, and a nipple on the end of the tube having a minute orifice to reduce the pressure of oil flowing into the tube; together with a packing in the lower portion of the filtering chamber, perforated annular disks resting on the shoulder in the upper end of said chamber and through which the tube passes, and fine mesh screens interposed between the perforated disks.

THOMAS J. McNULTY.